United States Patent [19]
Gonidec et al.

[11] Patent Number: 5,765,362
[45] Date of Patent: Jun. 16, 1998

[54] PIVOTING DOOR THRUST REVERSER WITH COWLING MOUNTED AUXILIARY PANEL

[75] Inventors: Patrick Gonidec, Sainte Adresse; Guy Bernard Vauchel, Le Havre, both of France

[73] Assignee: Societe Hispano Suiza, Colombes Cedex, France

[21] Appl. No.: 707,511

[22] Filed: Sep. 4, 1996

[30] Foreign Application Priority Data

Sep. 6, 1995 [FR] France .................. 95 10418

[51] Int. Cl.⁶ .................................................. F02K 1/70
[52] U.S. Cl. .................. 60/226.2; 60/230; 244/110 B; 239/265.29
[58] Field of Search .................. 60/226.2, 230; 244/110 B; 239/265.19, 265.27, 265.29

[56] References Cited

U.S. PATENT DOCUMENTS

| | | | |
|---|---|---|---|
| 3,475,913 | 11/1969 | Mortlock et al. | 60/226.2 |
| 3,736,750 | 6/1973 | Britt | 60/226.2 |
| 3,739,582 | 6/1973 | Maison | 60/226.2 |
| 4,894,985 | 1/1990 | Dubois et al. | 60/226.2 |
| 5,003,770 | 4/1991 | Schegerin | 60/230 |
| 5,039,171 | 8/1991 | Lore | 60/226.2 |
| 5,090,197 | 2/1992 | Dubois | 60/226.2 |
| 5,120,004 | 6/1992 | Matthias | 60/226.2 |
| 5,267,438 | 12/1993 | Bunel et al. | 60/226.2 |
| 5,284,015 | 2/1994 | Carmali et al. | 60/226.2 |

FOREIGN PATENT DOCUMENTS

| | | | |
|---|---|---|---|
| 0 413 635 A1 | 2/1991 | European Pat. Off. | |
| 0 524 624 A1 | 5/1993 | European Pat. Off. | |
| 601910 | 6/1994 | European Pat. Off. | 60/226.2 |

*Primary Examiner*—Timothy Thorpe
*Assistant Examiner*—Ted Kim
*Attorney, Agent, or Firm*—Bacon & Thomas

[57] ABSTRACT

The present invention relates to a thrust reverser for a turbojet engine having at least one thrust reverser door pivotally attached to a cowling so as to pivot about a first pivot axis between a forward thrust position, wherein the thrust reverser door closes a thrust reverse opening in the cowling, and a reverse thrust position in which the thrust reverse opening is opened. The thrust reverser door moves from the forward thrust position to the reverse thrust position about its pivot axis in a first pivot direction. The invention also includes a thrust reverser panel pivotally attached to the cowling so as to pivot about a second pivot axis between a forward thrust position and a reverse thrust position. In pivoting from the forward thrust position to the reverse thrust position, the thrust reverser panel pivots in a second direction about its axis, the pivoting direction of the thrust reverser panel being opposite to the pivoting direction of the thrust reverser door.

20 Claims, 10 Drawing Sheets

PIVOTING DOOR THRUST REVERSER WITH COWLING MOUNTED AUXILIARY PANEL

BACKGROUND OF THE INVENTION

The present invention relates to a thrust reverser for a turbojet engine, more particularly a thrust reverser for a turbofan-type turbojet engine having thrust reversing panels mounted on the fan cowling and cooperating with pivoting thrust reverser doors.

Turbofan-type turbojet engines are well known in the art and typically comprise a fan driven at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

Figures 1, 2:
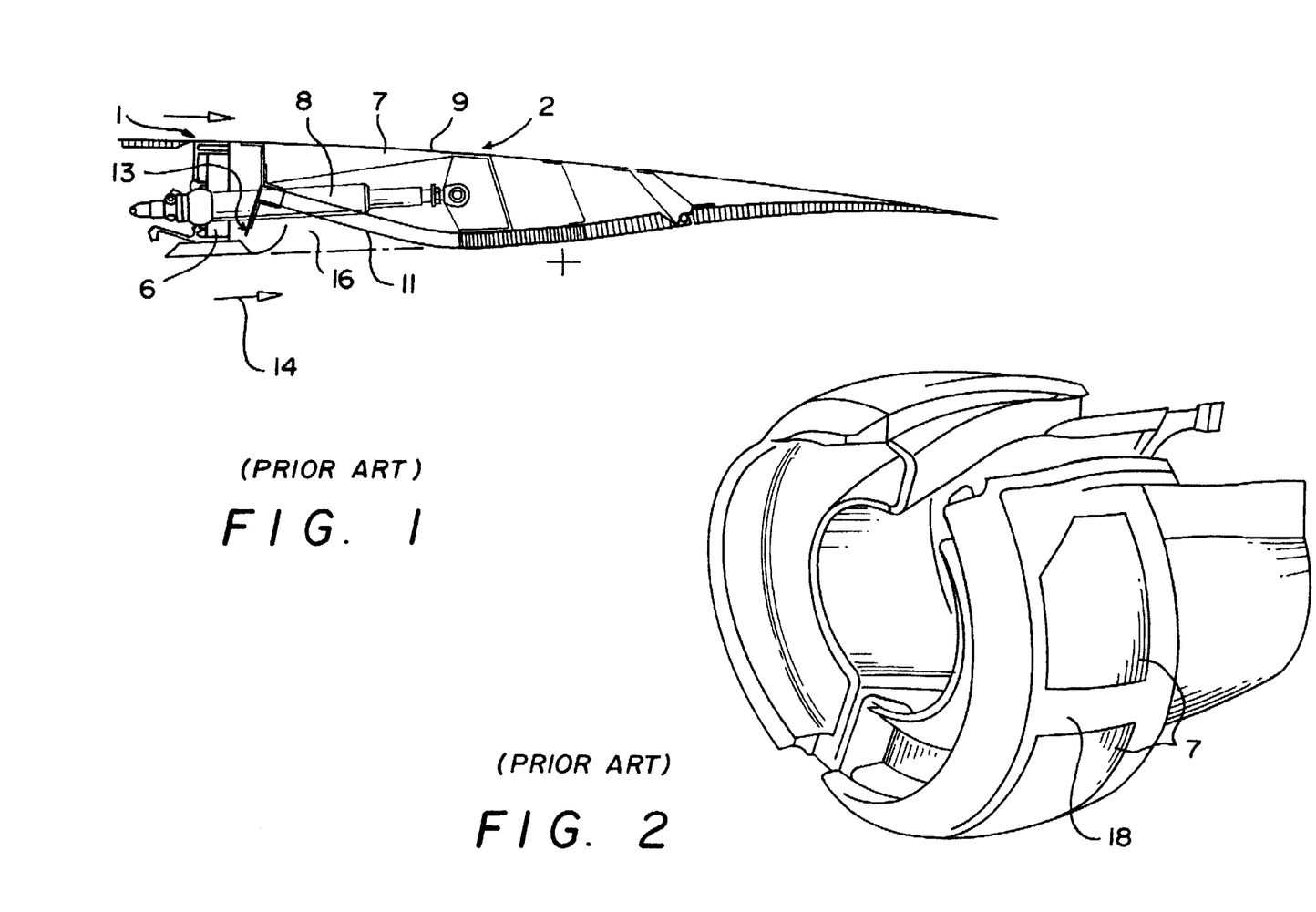
FIG. 1 is a partial, cross-sectional schematic view of a known pivoting door thrust reverser with the thrust reverser door in the forward thrust position.
FIG. 2 is a partial, perspective view of turbofan engine cowling incorporating the known thrust reverser doors illustrated in FIG. 1.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct through which the bypass flow air passes in the direction of arrow 14.

The fan cowling also comprises a thrust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder extending through and mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

As illustrated in FIG. 2, a plurality of thrust reverser doors 7 may be incorporated into the fan cowling, such doors

2 being circumferentially spaced around the periphery of the fan cowling. A portion 18 of the fan cowling extends axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. 3,605,411 discloses a pivoting door-type thrust reverser in which the deflector mounted to the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflectors 13 project from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passages cleared by the upper portion of the thrust reverser doors which cause the doors to be biased in the open, thrust reversing direction. The full cross-section of the flow passages must be larger than the associated duct cross-section in a plane taken upstream, or forward, of the door on account of the pressure losses due to the gas flow deflection since the unobstructed downstream, or rearward portion of the duct unobstructed by the inwardly protruding portion of the thrust reverser doors is minimized in order to produce an appropriate reverse thrust force.

Quite obviously, the bias of the doors toward the open or reverse thrust position is a safety drawback. The reverser would be safer if the pressure applied to the thrust reverser door biased the door towards the closed or forward thrust position. This consideration also applies to thrust reverser door that would tend to close again under pressure even if they were partially deployed towards the thrust reversing position.

In some cases, the effect of the pressure is such that very high stresses are transmitted through the thrust reverser door actuators between their attachment points to the upstream portion of the cowling and the doors. As a consequence, this structure and the door locking mechanisms must be undesirably heavy.

European Patent 0 413 635 discloses a thrust reverser having a pivoting door associated with an interior panel that is directly linked to the door. Thus, when the thrust reverser door pivots about its pivot axis, the associated panel pivots about the panel pivot axis in the same direction as the door. This design includes a drawback that the inner panel acts as a shield for the redirected gas flow so as to prevent a portion of the gases from encountering the inner surface of the thrust reverser door, thereby precluding optimal gas flow guidance in the reverse thrust position.

SUMMARY OF THE INVENTION

The present invention relates to a thrust reverser for a turbojet engine having at least one thrust reverser door pivotally attached to a cowling so as to pivot about a first pivot axis between a forward thrust position, wherein the thrust reverser door closes a thrust reverse opening in the cowling, and a reverse thrust position in which the thrust reverse opening is opened. The thrust reverser door moves from the forward thrust position to the reverse thrust position about its pivot axis in a first pivot direction. The invention also includes a thrust reverser panel pivotally attached to the cowling so as to pivot about a second pivot axis between a forward thrust position and a reverse thrust position. In pivoting from the forward thrust position to the reverse thrust position, the thrust reverser panel pivots in a second direction about its axis, the pivoting direction of the thrust reverser panel being opposite to the pivoting direction of the thrust reverser door.

By pivoting the thrust reverser panel in a direction opposite to the pivoting direction of the thrust reverser door, the panel forms a scoop which directs a portion of the gases flowing through the gas flow duct through the reverse thrust opening by directing these gases in a particular direction to further increase the thrust reversing efficiency of the device.

DETAILED DESCRIPTION OF THE PREFERRED EMBODIMENTS

Figure 3:
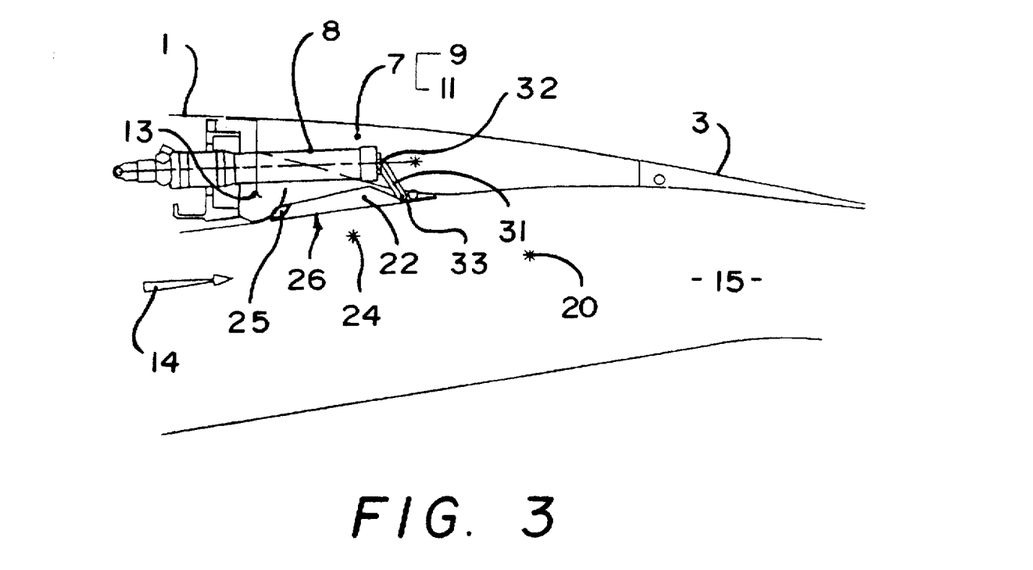
FIG. 3 is a partial, schematic, cross-sectional view of illustrating a first embodiment of the thrust reverser according to the present invention with the thrust reverser door and panel in the forward thrust positions.
Figure 4:
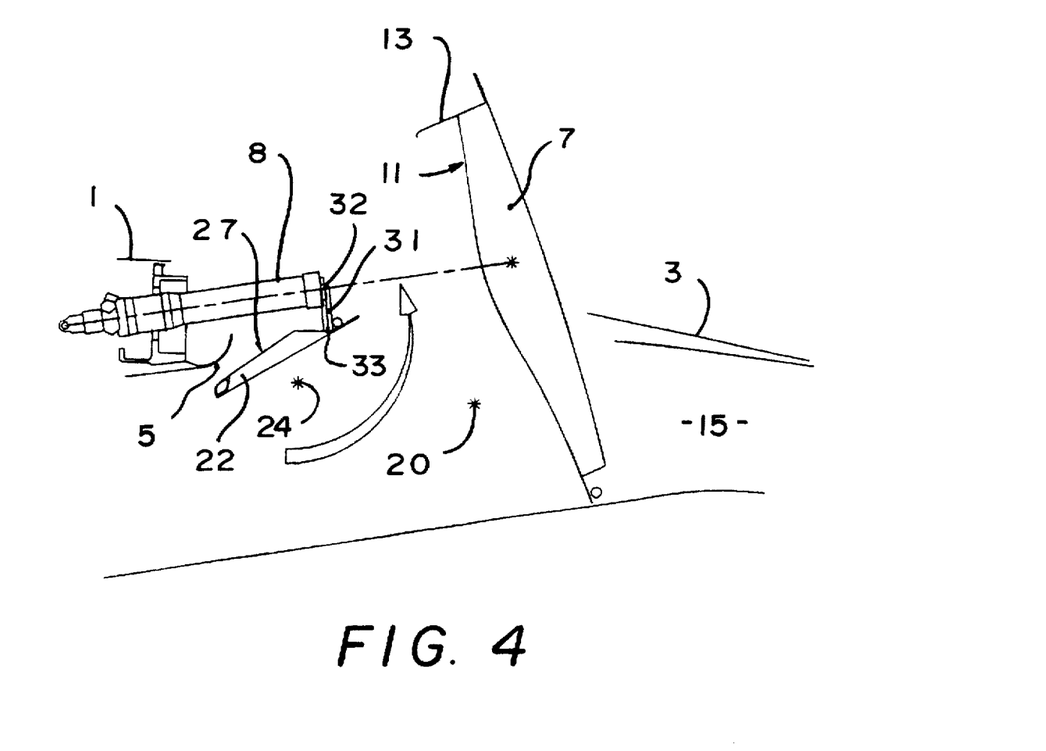
FIG. 4 is a view similar to FIG. 3, but illustrating the thrust reverser door and a thrust reverser panel in the reverse thrust positions.

A first embodiment of the invention is illustrated in FIGS. 3 and 4. Elements having the same structure and/or function as those of the known thrust reverser (illustrated in FIG. 1) have been assigned the same identifying numerals. As can be seen, the thrust reverser includes the upstream structure 1, thrust reverser door 7 having an outer surface 9 and an inner surface 11 and a downstream fairing 3. A deflector 13 is fitted to the forward, or upstream, edge of the thrust reverser door 7 so as to provide a forward component to the gases when the door 7 is in the reverse thrust position. The present invention includes a thrust reverser panel 22 having an inner surface 26 which forms a portion of the boundary of the annular flow duct 15 through which the gases pass in the direction of arrow 14, when the thrust reverser panel is in its forward thrust position as illustrated in FIG. 3. A seal 25 is interposed between a forward edge of the panel 22 and the upstream structure 1 and between the rear edge of the panel and the door 7 to prevent leakage of the gases at these junctures. Although the seal 25 is illustrated as being attached to the thrust reverser panel 22, quite obviously, the seal 25 may be attached to the upstream structure 1. Similarly, a seal may be interposed between the downstream edge of the thrust reverser panel 22 and the door 7. Again, the seal may be attached to either the door 7 or the thrust reverer panel 22.

The thrust reverser door 7 pivots about pivot axis 20 between its forward thrust position, illustrated in FIG. 3 and its reverse thrust position, illustrated in FIG. 4. The thrust reverser door 7 may be physically attached to the longitudinally extending portions 1 8 of the cowling as in the known prior art illustrated in FIG. 2. The pivot axis 20 extends generally transversely to the longitudinal axis of the engine (not shown). As can be seen, the thrust reverser door 7 pivots about the pivot axis 20 when moving from its forward thrust position to its reverse thrust position in a first direction, clockwise as illustrated in FIGS. 3 and 4.

The thrust reverser panel 22 is also physically attached to the longitudinal portions 18 of the cowling so as to pivot about a second pivot axis 24. However, when moving from its forward thrust position to its reverse thrust position, the thrust reverser panel 22 moves in a second direction about its pivot axis, the second direction being opposite to the first direction of movement of the thrust reverser door 7. Thus, as illustrated in FIG. 4, the thrust reverser panel 22 moves about axis 24 in a counter-clockwise direction when moving from its forward thrust position to its reverse thrust position.

Such movement of the thrust reverser panel 24 is caused by the pivoting movement of the actuator 8 about its pivot attachment to the upstream structure 1. Such pivoting movement is caused by the extension and retraction of the piston rod extending from the cylinder and connected to the thrust reverser door. Thus, as the piston rod is extended to move the thrust reverser door 7 toward its reverse thrust position, the actuator 8 will pivot about its attachment to the upstream structure 1 in a counter-clockwise direction as illustrated in the figures. This pivoting motion is imparted to the thrust reverser panel 22 by linkrod 31 which has one end pivotally connected to the actuator 8 and an opposite end pivotally connected to the thrust reverser panel 22. Depending upon the specific requirements of each particular application, the angle of movement the thrust reverser panel 22 may be slightly modified by repositioning the pivot axis 24, the repositioning of the pivot points 32 and 33, the attachment points of the linkrod 31.

The opposite movement direction of the thrust reverser panel from that of the thrust reverser door enables the thrust reverser panel 22 to "scoop up" a portion of the gases flowing through the annular duct 15 and redirect this portion toward the upstream, or forward inner wall 11 of the thrust reverser door 7 and constraining the remaining portion of the gas flow to contact the thrust reverser door 7 in the zone of the deflector 13 thereby increasing the effect of the deflector 13 and increasing the efficiency of the thrust reverser.

Figure 5:
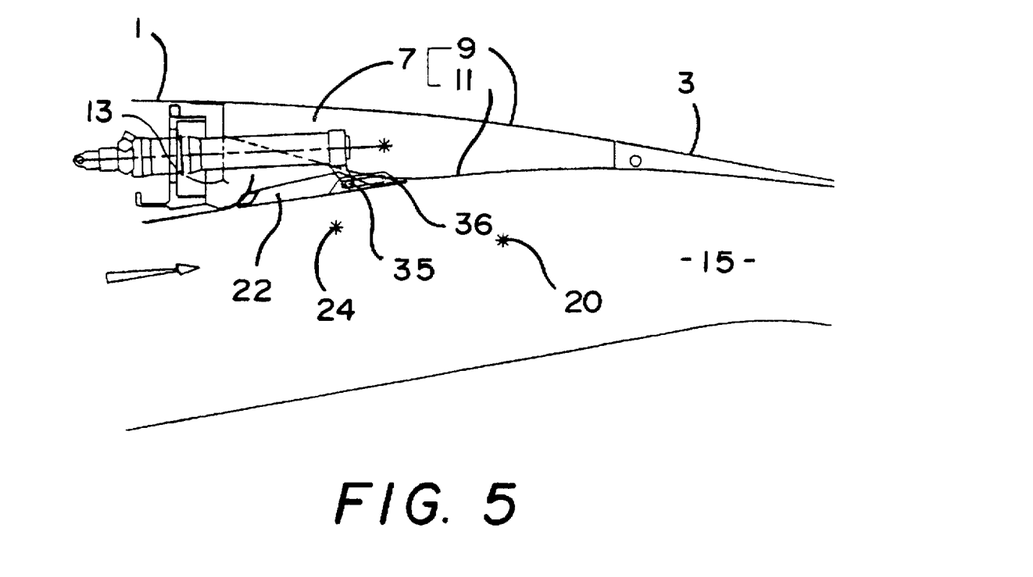
FIG. 5 is a partial, cross-sectional, schematic view illustrating a second embodiment of the thrust reverser according to the present invention with the thrust reverser door and the thrust reverser panel in their forward thrust positions.
Figure 6:
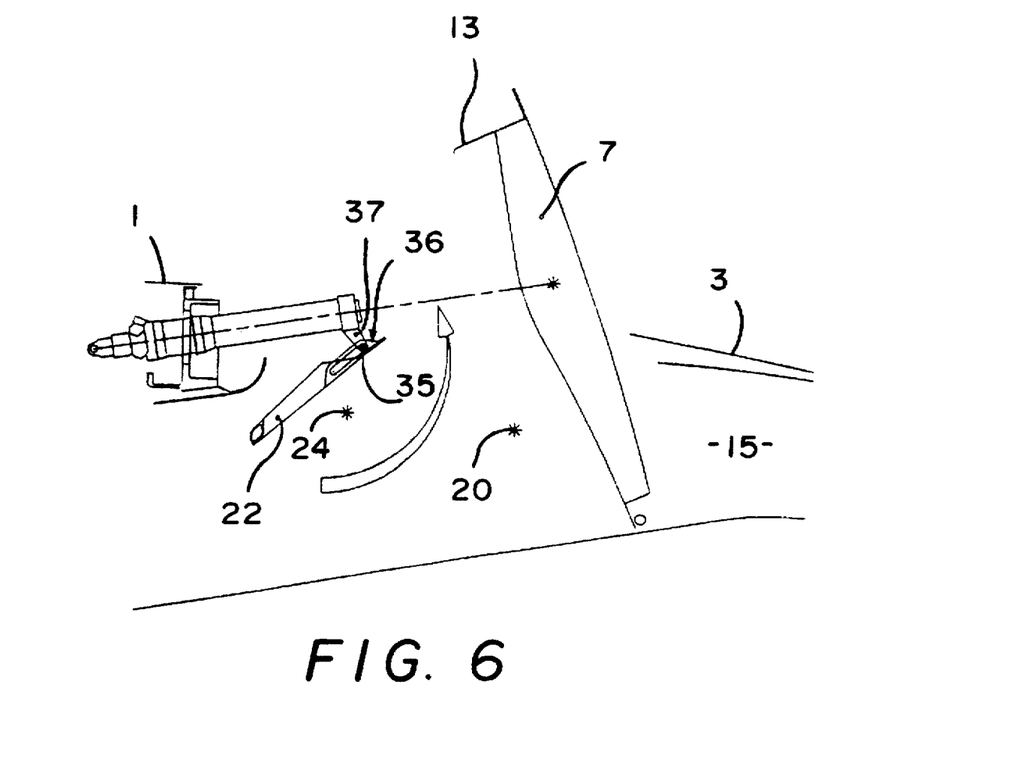
FIG. 6 is a view similar to FIG. 5, illustrating the thrust reverser door and the thrust reverser panel in their reverse thrust positions.

FIGS. 5 and 6 illustrate a second embodiment of the present invention. The only difference between this embodiment and that previously described is in the linkage mechanism connecting the thrust reverser panel 22 to the actuator 8. A bracket 36 is attached to the thrust reverer panel 22, the bracket having an elongated slot therein. A support 37 extends from the actuator 8 and has a one or more rollers 35 attached to the end thereof. The rollers engage the elongated slot in the guide bracket 36. As can be seen in FIGS. 5 and 6, the pivoting movement of the actuator 8 about its attachment to the upstream structure 1 will, again, cause the thrust reverser panel 22 to pivot about its pivot axis 24 between the forward and reverse thrust positions in a direction opposite to the pivoting direction of thrust reverser door 7.

Figure 7:
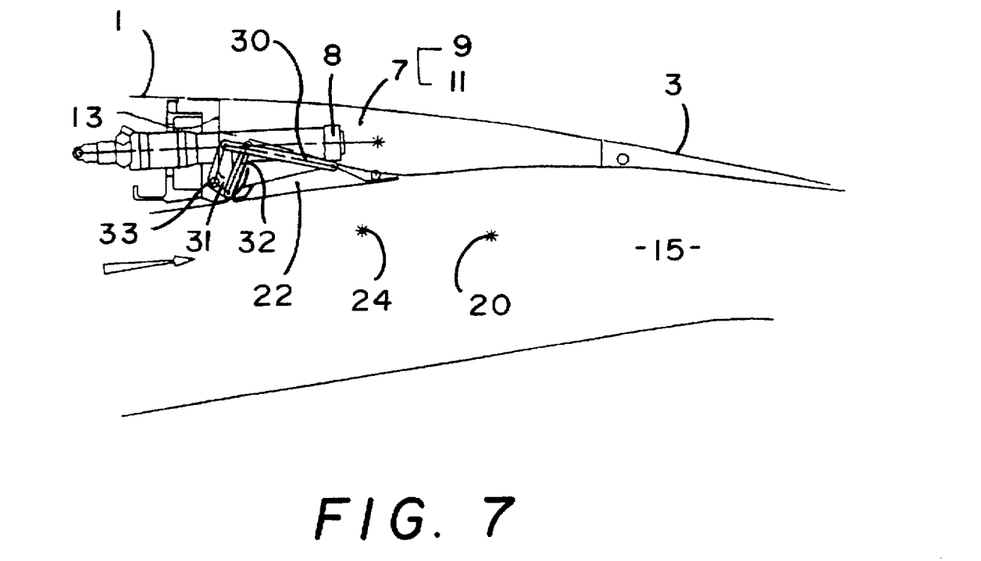
FIG. 7 is a partial, cross-sectional schematic view of a third embodiment of the present invention illustrating the thrust reverser door and the thrust reverser panel in their forward thrust positions.
Figure 8:
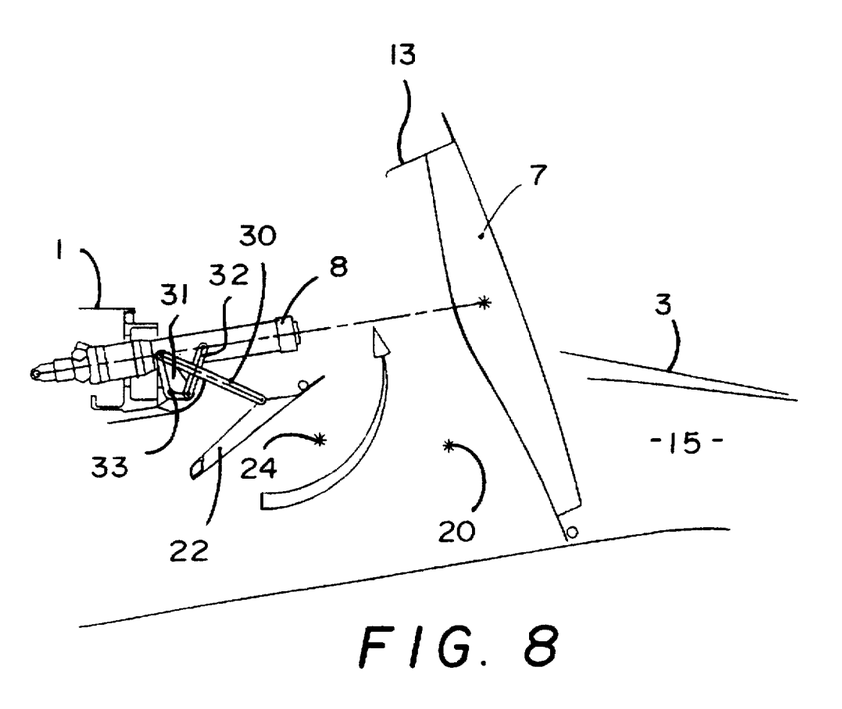
FIG. 8 is a view similar to FIG. 7, but illustrating the thrust reverser door and the thrust reverser panel in their reverse thrust positions.

Another linkage mechanism connecting the actuator to the thrust reverser panel 22 is illustrated in FIGS. 7 and 8. As illustrated therein, it is possible to utilize a linkage mechanism that multiplies the movement of the actuator 8. In this particular embodiment, a bellcrank 31 is pivotally attached to the cowling with a linkrod 32 pivotally connected to the actuator 8 and to the bellcrank 31 on one side of its pivot attachment 33. A second linkrod 34 is pivotally connected to the thrust reverser panel 22 and to the bellcrank 31 on an opposite side of the pivot connection 33. As can be seen, the pivoting movement of the actuator 8 about its attachment to the upstream structure 1 will pivot the bellcrank 31 about its pivot connection 33 which, in turn, will cause movement of the thrust reverser panel 22 about its pivot axis. Again, the pivoting direction of the panel 22 will be opposite to that of the door 7.

Figure 9:
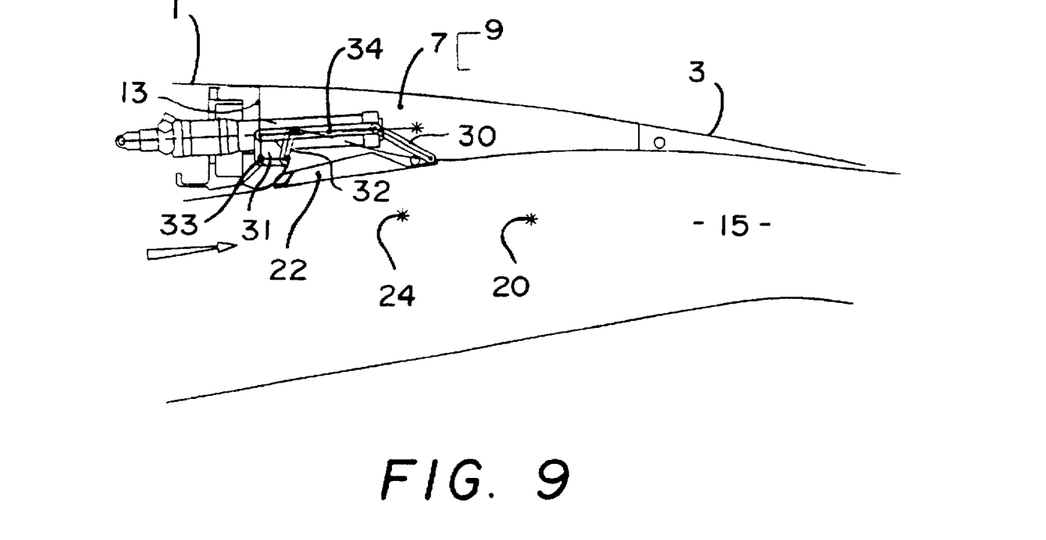
FIG. 9 is a partial, cross-sectional schematic view illustrating a fourth embodiment of the present invention with the thrust reverser door and the thrust reverser panel in their forward thrust positions.
Figure 10:
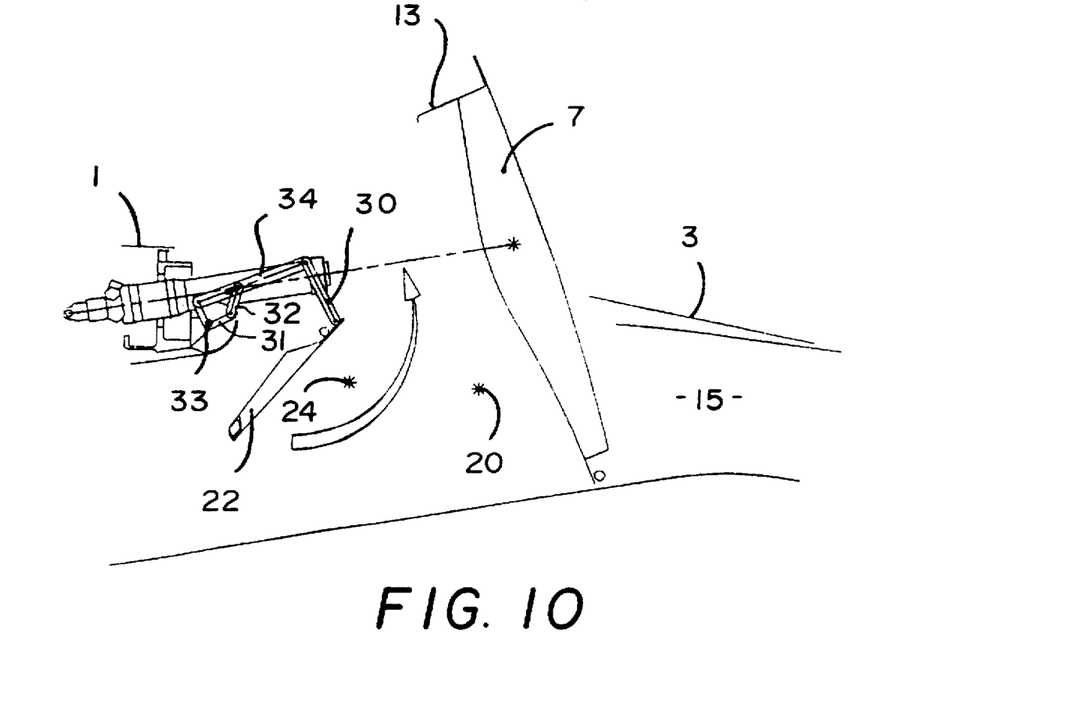
FIG. 10 is a view similar to FIG. 9, but illustrating the thrust reverser door and the thrust reverser panel in their reverse thrust positions.

In the embodiment illustrated in FIGS. 9 and 10, again, the only difference is in the linkage mechanism connecting the actuator 8 to the thrust reverser panel 22. Again, the bellcrank 31 is utilized and is pivotally attached to the upstream structure 1 at pivot 33 and has linkrod 32 connected to the actuator 8 and to one side of the bellcrank 31. However, in this embodiment, linkrod 30, is not directly connected to the bellcrank 31, as in the previously described embodiment. Linkrod 30 has a distal end connected to a second end of linkrod 34 which, in turn, has its first, opposite end attached to the bellcrank 31. As is readily apparent, the specific lengths and connecting points between the linkrods and the bellcrank may be altered in a specific application of the invention to achieve the desired movement of the thrust reverer panel 22.

Figure 11:
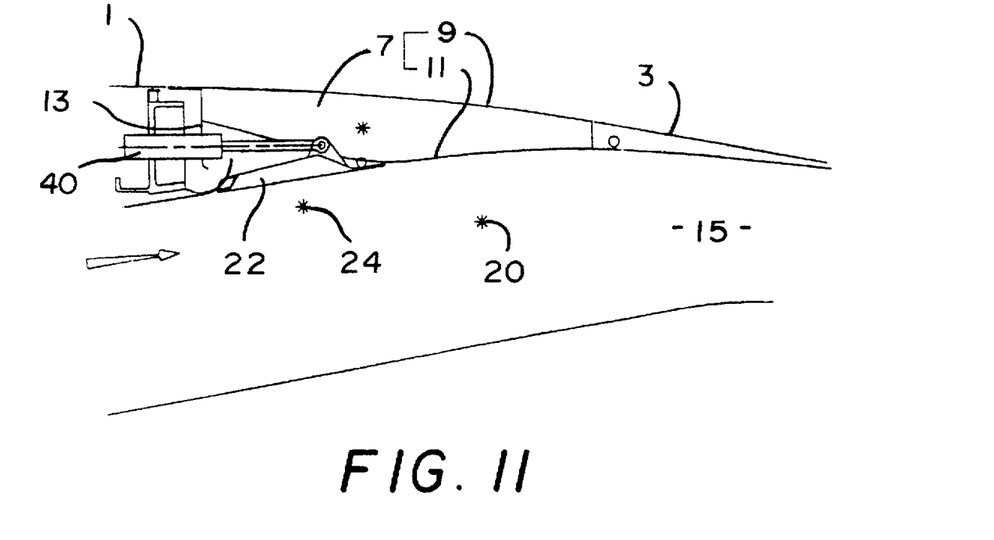
FIG. 11 is a partial, cross-sectional schematic view of a fifth embodiment the present invention with the thrust reverser door and the thrust reverser panel in their forward thrust positions.
Figure 12:
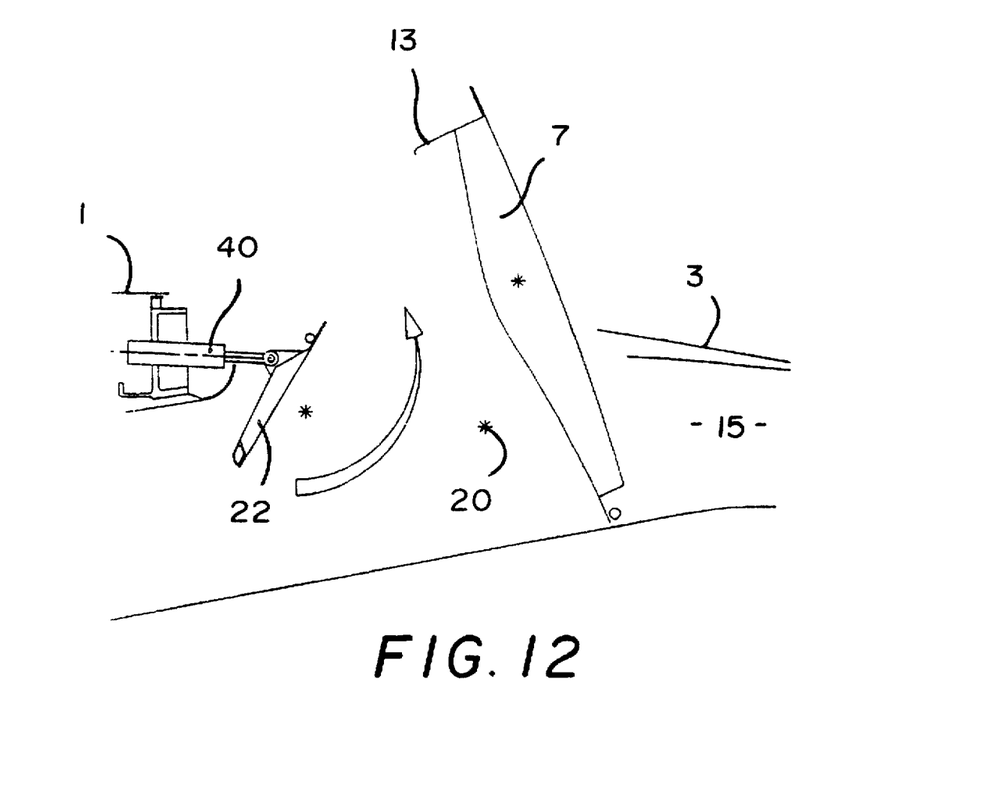
FIG. 12 is a view to similar to FIG. 11, but illustrating the thrust reverser door and the thrust reverser panel in their reverse thrust position.

In the embodiment in FIGS. 11 and 12, the thrust reverser panel 22 has its own, separate actuator 40 which may comprise a cylinder connected to the upstream structure 1 having an extendable and retractable piston rod directly connected to the thrust reverser panel 22. The actuator 40 may comprise any known actuator, such as an electrical actuator, hydraulic actuator, pneumatic actuator, etc. The operation of this actuator may be synchronized with the operation of the entirety of the thrust reverser, or may be made totally independent depending upon the requirements of each specific application.

If the thrust reverser panel 22 is completely decoupled from the operation of the thrust reverser door 7 it may be operated at any time during the reverse thrust operation and thus can meet optimal performance conditions. The opening angle of the thrust reverser panel 22 is easily adjustable, since it is free from any kinematic connection with other elements in the system. Depending upon the desired reverse thrust affect, it is possible not to move the thrust reverser panel 22 to its reverse thrust position. Whether or not the thrust reverser panel 22 is self-closing in this embodiment, as well as the previously discussed embodiments, will depend upon the precise location of the pivot axis 24 relative to the front edge and rear edge of the panel 22. If the pivot axis 24 is located more towards the rear edge of the panel 22, the forces exerted on the panel by the gases passing through the annular duct 15 will urge the panel 22 toward its closed, or forward thrust position.

Figure 13:
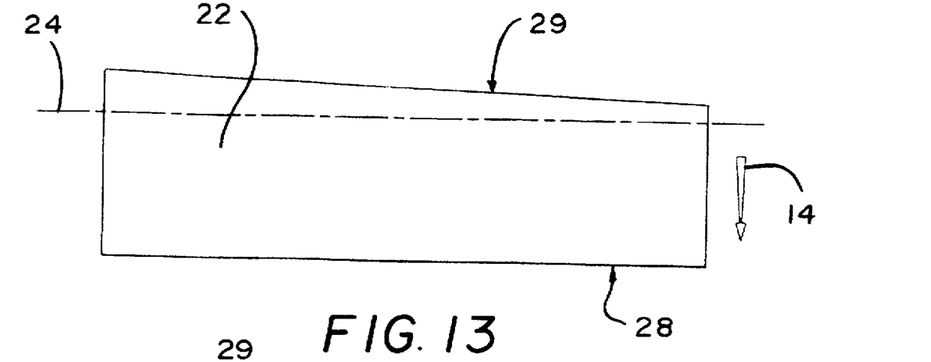
FIGS. 13–16 are top plan views of various configurations of thrust reverser panels utilized with the present invention.
Figure 14:
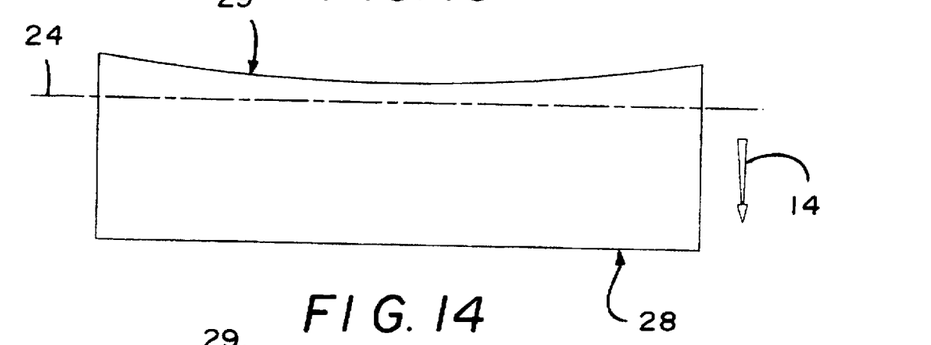
Figure 15:
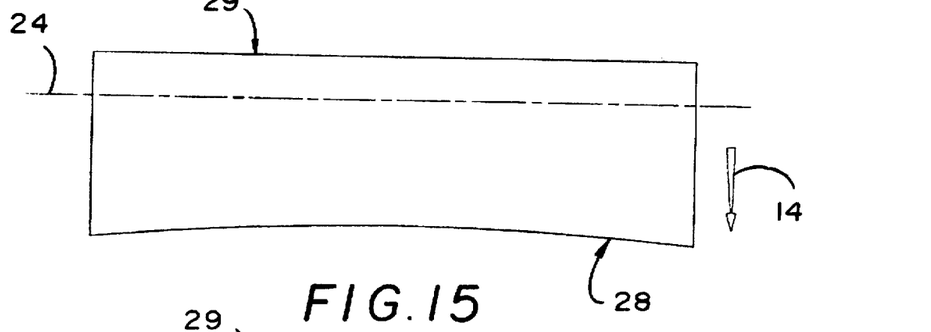
Figure 16:
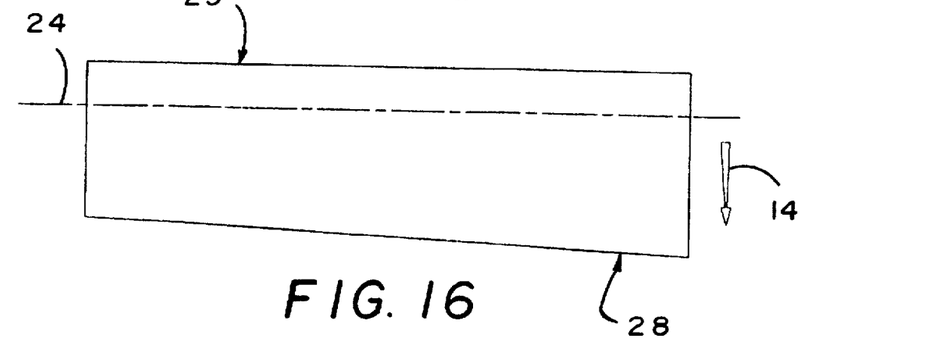

The particular configuration of each of the thrust reverser panels 22 may vary according to each specific application. FIGS. 13-16 illustrate various configurations of the thrust reverser door panel 22. In each of these figures, the panel 22 has an upstream, or front edge 28 and a downstream, or rear edge 29. In FIG. 13, the front edge 28 is substantially parallel to the pivot axis 24 and the rear edge 29 is skewed with respect to the front edge. In FIG. 14, the rear edge 29 has a generally concave configuration with the front edge 28 having a straight configuration. The configurations of these edges may be reversed, as illustrated in FIG. 15, wherein the front edge 28 is convex and the rear edge 29 is straight and substantially parallel to the pivot axis 24. FIG. 16 illustrates the configuration in which the rear edge 29 is straight and substantially parallel to the pivot axis 24 and the forward edge 28 is skewed. Again, these configurations may be used in combination so as to direct the gases passing through the reverse thrust opening in the cowling in a particular direction depending upon the specific application and location of the thrust reverser on the engine cowling. While a variety of specific configurations are illustrated, other configurations may be utilized without exceeding the scope of this invention.

Figure 17:
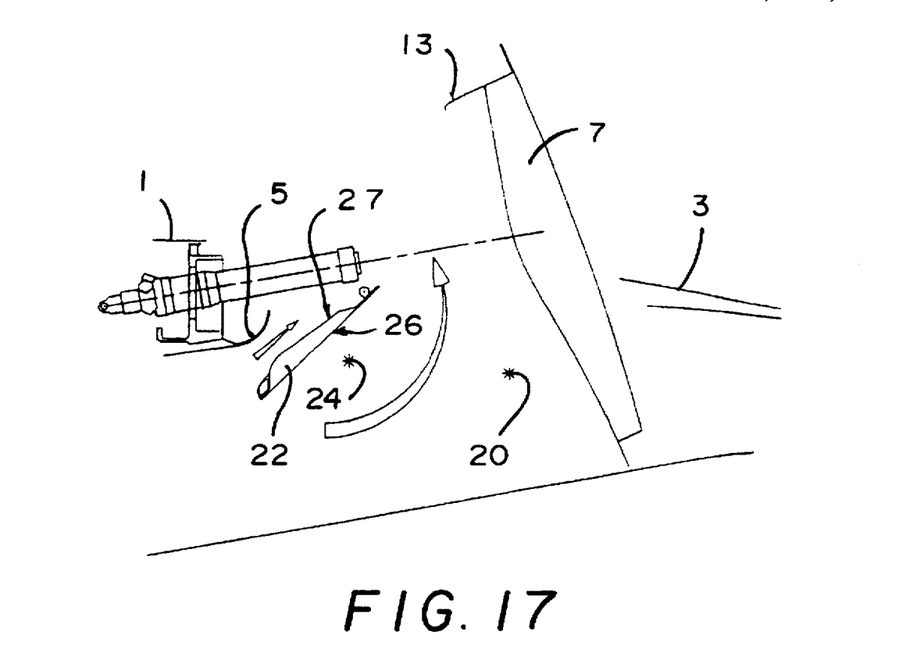
FIG. 17 is a partial, cross-sectional schematic view of a thrust reverser according to the present invention illustrating a first configuration of a surface of the thrust reverser panel in the reverse thrust position.
Figure 18:
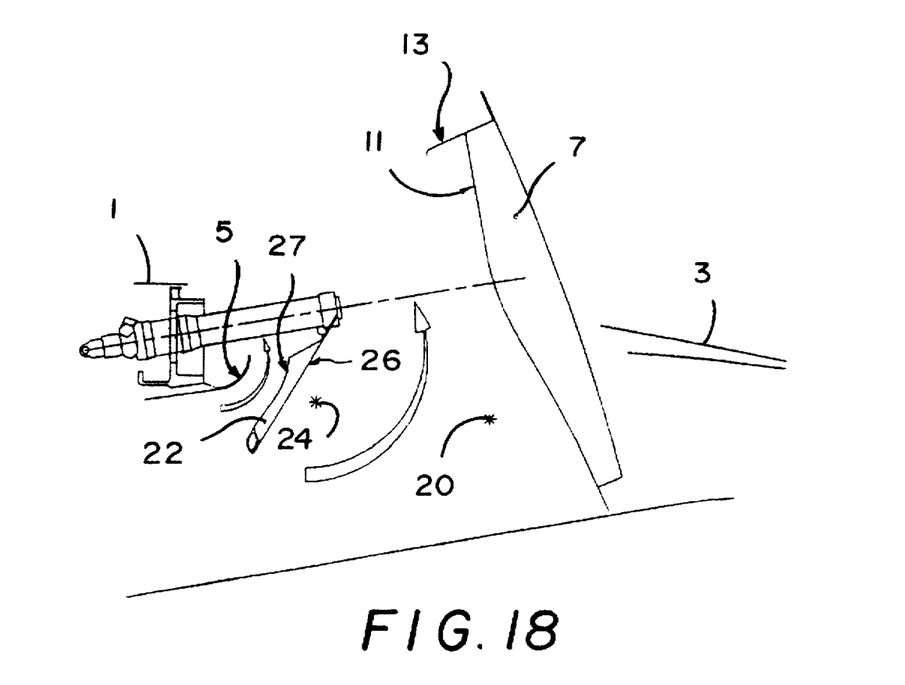
FIG. 18 is a view similar to FIG. 17, but illustrating a second alternative surface on the thrust reverser panel in its reverse thrust position.

The thrust reverser panel 22 has an inner, first surface 26 which forms a portion of the boundary of the gas flow duct when the thrust reverser panel is in the forward thrust position. The panel 22 also has a second, opposite surface 27 which has an aerodynamic configuration which, in conjunction with the deflection edge 5 of the upstream structure 1, optimizes the efficiency of the gas flow between these elements during thrust reversal. As illustrated in FIG. 17, the surface 27 may have a generally convave configuration, or, as illustrated in FIG. 18, this surface may have a generally concave configuration. Again, these configurations, or other configurations, may be utilized to optimize the gas flow with a particular deflection edge without exceeding the scope of this invention.

Figure 19:
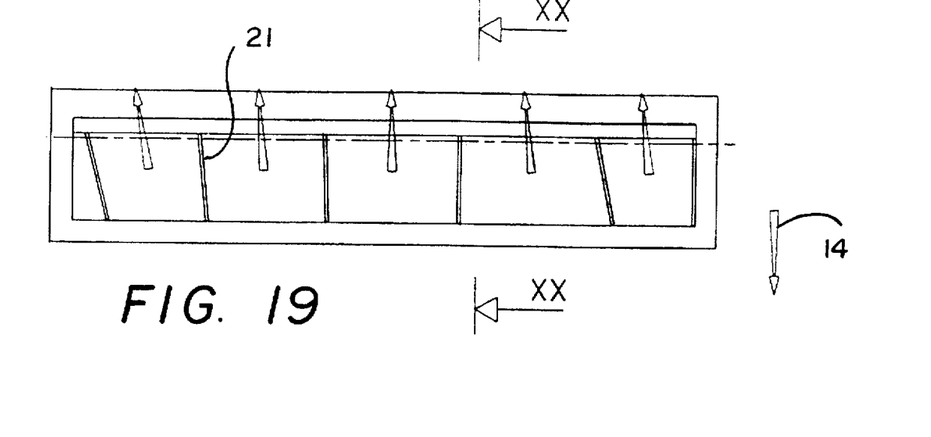
FIG. 19 is a top, plan view of the thrust reverser panel according to the present invention illustrating the positions of various flow guide vanes.
Figure 20:
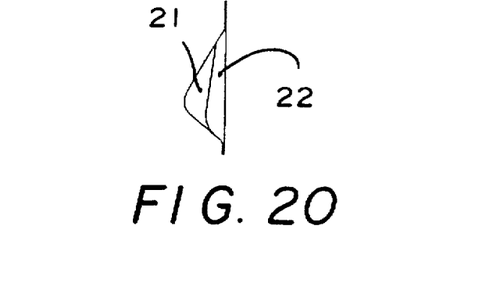
FIG. 20 is a cross-sectional view taken along line XX—XX in FIG. 19.
Figure 21:
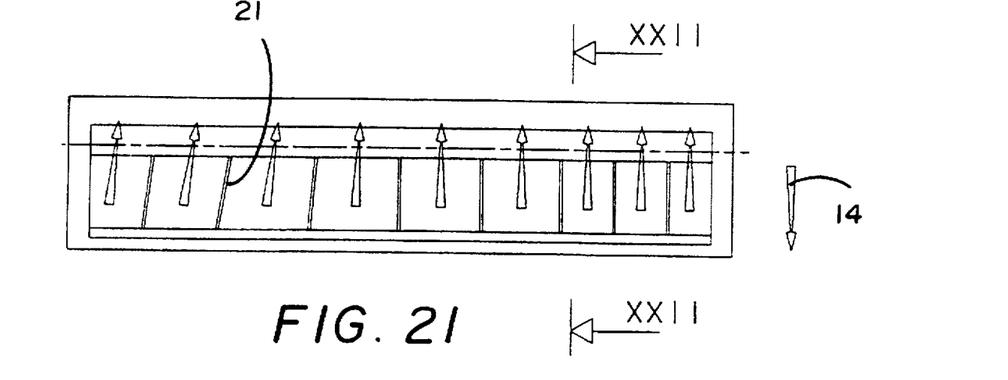
FIG. 21 is a view similar to FIG. 19, illustrating an alternative configuration of the flow guide vanes on the thrust reverser panel.
Figure 22:
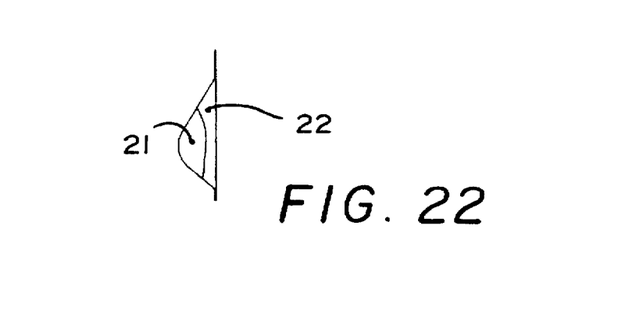
FIG. 22 is a cross-sectional view taken along line XXII—XXII in FIG. 21.

The thrust reverser panel 22 may also have one or more flow guide walls 21 extending from the surface 27. The walls 21, are illustrated in FIGS. 19–22 and, not only guide the gas flow over the inner surface 22, but also reinforce the strength of the individual panels 22. The flow guide walls 21 are arranged generally parallel to the longitudinal axis of the engine and may extend generally perpendicular to the panel surface 27, or may be angled with respect thereto. Again, depending upon each specific application, the flow guide walls 21 may extend parallel to each other or non-parallel to each other as desired. FIGS. 19 and 21 illustrate some of the guide walls being parallel to each other, while others are skewed. This enables the gas flow to be precisely directed as desired for a particular application.

Figure 23:
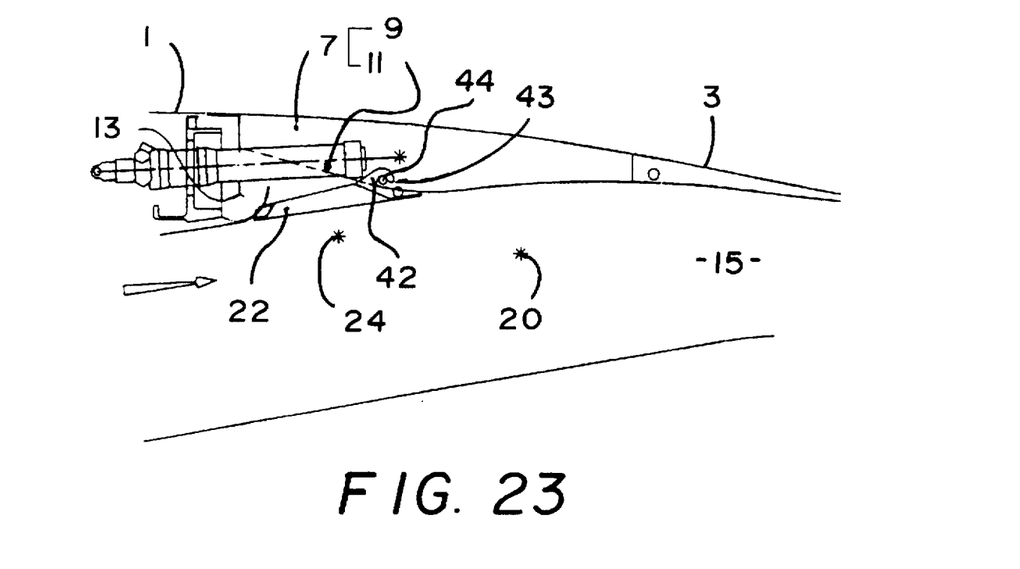
FIG. 23 is a partial, cross-sectional schematic view of a thrust reverser according to the present invention illustrating a locking system locking the thrust reverser door and the thrust reverser panel in their forward thrust positions.
Figure 24:
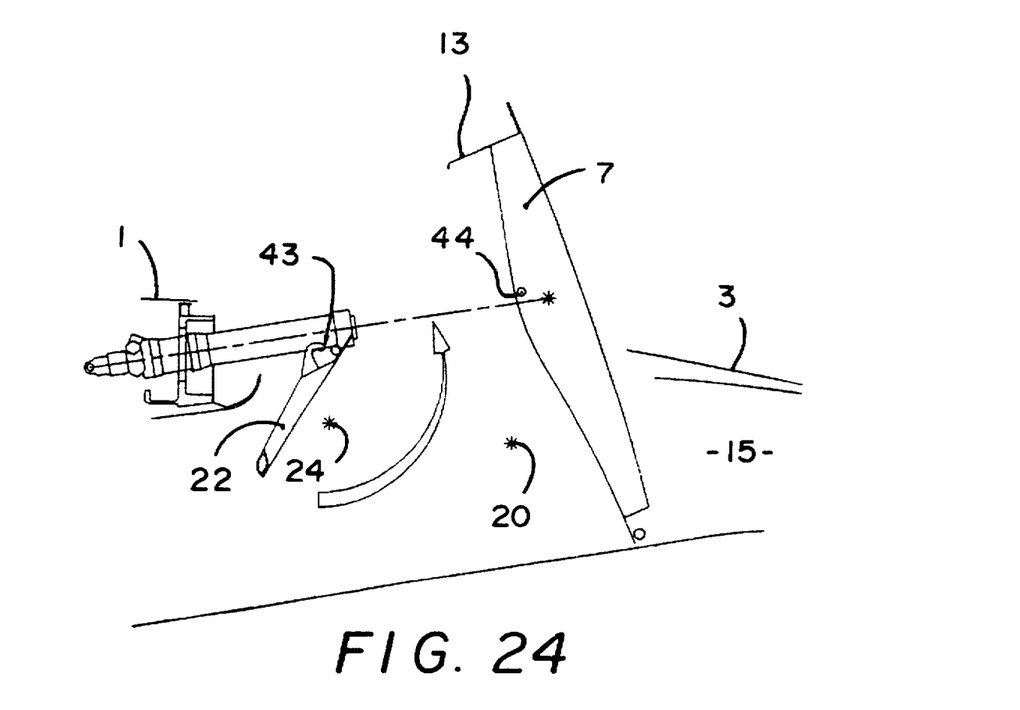
FIG. 24 is a view similar to FIG. 23, but illustrating the thrust reverser door and the thrust reverser panel in their reverse thrust positions.

A releasable locking device may also be utilized in conjunction with the present invention. As illustrated in FIGS. 23 and 24, the locking device 42 may comprise a hook 43 extending from the thrust reverser panel 22 and engageable with a pin 44 affixed to the thrust reverser door 7. When these elements are latched, as illustrated in FIG. 23, movement of either the thrust reverser door 7 or the thrust reverser panel 22 is precluded since these elements are latched or locked together. Known means may be utilized to disengage the hook 43 from the pin 44 so as to release the locking device and facilitate the normal operation of the thrust reverser door 7 and the thrust reverser panel 22.

The various embodiments of this invention may be utilized alone, or in combination with each other. If the thrust reverser has a plurality of thrust reverser doors and panels, the features of the various embodiments may be combined so as to precisely control the direction of gas flow through the reverse thrust opening during reverse thrust operations.

The foregoing description is provided for illustrative purposes only and should not be construed as in any way limiting this invention, the scope of which is defined solely by the appended claims.

We claim:

1. A thrust reverser for a turbojet engine having a cowling forming an outer boundary of a gas flow duct, the cowling having at least one reverse thrust opening therethrough, the thrust reverser comprising:

a) at least one thrust reverser door pivotally attached to the cowling so as to pivot about a first pivot axis between a forward thrust position wherein the at least one thrust reverser door closes the at least one thrust reverse opening and a reverse thrust position wherein the at least one thrust reverse opening is opened, a rear portion of the thrust reverser door extending into the gas flow duct and a forward portion of the thrust reverser door extending outwardly from the cowling whereby the at least one thrust reverser door redirects gas flowing through the gas flow duct outwardly through the at least one reverse thrust opening, the at least one thrust reverser door moving from the forward thrust position to the reverse thrust position in a first pivot direction about the first pivot axis;

b) an actuator pivotally connected to the cowling and to the at least one thrust reverser door so as to move the at least one thrust reverser door between the forward and reverse thrust positions: and, c) at least one thrust reverser panel pivotally attached to the cowling so as to pivot relative to the actuator and relative to the cowling about a second pivot axis between a forward thrust position and a reverse thrust position, the at least one thrust reverser panel moving from the forward thrust position to the reverse thrust position in a second direction about the second axis, the second direction being opposite to the first direction.

2. The thrust reverser of claim 1 further comprising a linkage assembly connecting the actuator and the at least one thrust reverser panel such that pivoting movement of the actuator moves the at least one thrust reverser panel between the forward and reverse thrust positions.

3. The thrust reverser of claim 2 wherein the linkage assembly comprises a linkrod having a first end pivotally connected to the actuator and a second end pivotally connected to the at least one thrust reverser panel.

4. The thrust reverser of claim 2 wherein the linkage assembly comprises:

a) a guide bracket on the at least one thrust reverser panel having an elongated slot therein; and, b) a support extending from the actuator having a roller thereon engaging the elongated slot.

5. The thrust reverser of claim 2 wherein the linkage assembly comprises:

a) a bellcrank pivotally attached to the cowling;

b) a first linkrod pivotally connected to the bellcrank and the thrust reverser panel.

6. The thrust reverser of claim 2 wherein the linkage assembly comprises:

a) a bellcrank pivotally connected to the cowling;

b) a first linkrod connected to the actuator and to the bellcrank;

c) a second linkrod having a first end connected to the bellcrank and a second end; and, d) a third linkrod connected to the thrust reverser panel and to the second end of the second linkrod.

7. The thrust reverser of claim 1 further comprising an actuator connected to the cowling and to the thrust reverser panel so as to move the thrust reverser panel between its forward and reverse thrust positions.

8. The thrust reverser of claim 7 wherein the actuator comprises a cylinder attached to the cowling, the cylinder having an extendable and retractable rod extending therefrom and connected to the thrust reverser panel.

9. The thrust reverser of claim 1 wherein the at least one thrust reverser panel has a front edge and a rear edge.

10. The thrust reverser of claim 1 wherein the at least one thrust reverser panel has a first surface forming a portion of the boundary of the gas flow duct when the at least one thrust reverser panel is in the forward thrust position and a second, opposite surface.

11. The thrust reverser of claim 10 wherein the second, opposite surface has an aerodynamic configuration so as to direct a portion of gases flowing through the gas flow duct through the reverse thrust opening when the at least one thrust reverser panel is in the reverse thrust position.

12. The thrust reverser of claim 11 wherein the second, opposite surface has a generally convex configuration.

13. The thrust reverser of claim 11 wherein the second, opposite surface has a generally concave configuration.

14. The thrust reverser of claim 10 further comprising at least one flow guide wall extending from the second, opposite surface so as to guide the direction of a portion of the gas flowing through the gas flow duct when the at least one thrust reverser panel is in the reverse thrust position.

15. The thrust reverser of claim 14 further comprising a plurality of flow guide walls.

16. The thrust reverser of claim 15 wherein at lest two flow guide walls extend substantially parallel to each other.

17. The thrust reverser of claim 15 wherein the turbojet engine has a longitudinal axis and wherein at least one of the flow guide walls is generally parallel to the longitudinal axis.

18. The thrust reverser of claim 15 wherein the turbojet engine has a longitudinal axis and wherein at least one of the flow guide walls is skewed with respect to the longitudinal axis.

19. The thrust reverser of claim 1 further comprising a releasable locking device acting on the at least one thrust reverser panel so as to releasably prevent movement of the at least one thrust reverser panel from the forward thrust position.

20. The thrust reverser of claim 19 wherein the releasable locking device releasably locks the at least on thrust reverser panel to at least one thrust reverser door.

* * * * *